United States Patent [19]
Samson et al.

[11] Patent Number: 5,936,762
[45] Date of Patent: *Aug. 10, 1999

[54] DOPED OPTICAL WAVEGUIDE AMPLIFIER

[75] Inventors: Bryce Neilson Samson; Daniel William Hewak; Richard Ian Laming; David Neil Payne, all of Hampshire, United Kingdom

[73] Assignee: University of Southhamton, Hampshire, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/727,542

[22] PCT Filed: Apr. 22, 1995

[86] PCT No.: PCT/GB95/00928

§ 371 Date: Feb. 26, 1997

§ 102(e) Date: Feb. 26, 1997

[87] PCT Pub. No.: WO95/29522

PCT Pub. Date: Nov. 2, 1995

[30] Foreign Application Priority Data

Apr. 22, 1994 [GB] United Kingdom ................... 9407996

[51] Int. Cl.$^6$ ................................ H01S 3/17; H01S 3/06

[52] U.S. Cl. ....................... 359/341; 359/342; 359/343; 372/6; 372/40

[58] Field of Search ................................ 359/341, 342, 359/343, 345; 385/141; 372/6, 40

[56] References Cited

U.S. PATENT DOCUMENTS

| | | | |
|---|---|---|---|
| 3,866,142 | 2/1975 | Clive et al. ............................. | 372/40 |
| 5,240,885 | 8/1993 | Aitken et al. ........................... | 501/40 |
| 5,295,146 | 3/1994 | Gavrilovic et al. ..................... | 372/41 |
| 5,346,865 | 9/1994 | Aitken et al. ........................... | 501/40 |

OTHER PUBLICATIONS

Samson et al, Optics Letters, vol. 22, #10, pp. 703–705, May, 15, 1997; Abst. only herewith.

*Primary Examiner*—Nelson Moskowitz
*Attorney, Agent, or Firm*—Renner, Otto, Boisselle & Sklar, P.L.L.

[57] ABSTRACT

The core of a low phonon energy glass optical fibre is doped with trivalent Dysprosium ions for application as an efficient optical fibre amplifier operating around 1.3 μm. The device utilises the transition $^6H_{9/2}$–$^6F_{11/2}$ to $^6H_{15/2}$. The low phonon energy (high quantum efficiency) glasses include mixed halides, chalcogenides and chalcohalides. Improvements in efficiency can be achieved by co-doping of the fibre core with $Eu^{3+}$ and/or $Tb^{3+}$ ions.

17 Claims, 12 Drawing Sheets

DOPED OPTICAL WAVEGUIDE AMPLIFIER

This invention relates to doped optical waveguide amplifiers.

Optical waveguide amplifiers, and in particular optical fibre amplifiers, are used widely in the telecommunications industry.

An example of an optical fibre amplifier is the erbium doped fibre amplifier (EDFA) which operates in the so-called third telecoms window (wavelengths around 1500 nanometres (nm)). These devices are characterised by their high gain (around 30 decibels (dB)) achieved with limited pump power (less than 50 milliwatts (mW)), which means that pumping can be performed using a single laser diode unit.

However, in the important second telecoms window (wavelengths around 1300 nm), known optical fibre amplifiers operate with a much lower efficiency. The best performance reported so far has been obtained using trivalent Praseodymium ($Pr^{3+}$) doped fluoride fibre amplifiers (PDFFAs), which achieve a small signal gain of about 23 dB with about 120 mW of pump from a single semiconductor laser diode unit. Operating the pump diode at high drive current to achieve this pump power can severely curtail the lifetime of the diode. This problem has limited the application of this amplifier unit.

Application of PDFFAs as high output power amplifiers using solid state neodymium-yttrium-lanthanum-fluoride (Nd:YLF) lasers as the pump source have achieved a higher operating efficiency than the diode pumped device. However, the use of an expensive solid state laser for pumping the fibre amplifier is far from ideal for many applications such as in-line optical fibre amplifiers.

It has been proposed to use dysprosium as a dopant in optical waveguide amplifiers. In EP-A-0570743, fluoride or silica ($SiO_2$) glass fibres are doped with dysprosium ($Dy^{3+}$) ions to provide a 1300 nm optical amplifier.

This invention provides an optical waveguide amplifier comprising a glass optical waveguide doped with dysprosium ions, the highest frequency phonon mode of the glass having an energy of less than 450 $cm^{-1}$, in which the glass waveguide is doped with at least one rare earth co-dopant to decrease the lifetime of the $^6H_{11/2}$ and/or $^6H_{13/2}$ energy levels of the dysprosium ion. (cm is an abbreviation for centimetre.)

This invention also provides an optical waveguide amplifier comprising a glass optical waveguide doped with dysprosium ions, the glass not being a fluoride or silica glass, in which the glass waveguide is doped with at least one rare earth co-dopant to decrease the lifetime of the $^6H_{11/2}$ and/or $^6H_{13/2}$ energy levels of the dysprosium ion.

The invention recognises that the nature of the glasses previously proposed in dysprosium doped optical waveguide amplifiers can dramatically limit the performance of those amplifiers. By using glasses having either a low phonon energy or glasses having a high quantum efficiency (a quantity related to the phonon energy and/or type of glass), the efficiency of the $Dy^{3+}$ dopant can be greatly improved.

The performance of the amplifier is improved by the inclusion of at least one rare earth co-dopant to decrease the lifetime of the $^6H_{11/2}$ and/or $^6H_{13/2}$ energy levels of the dysprosium ion. This can improve the efficiency of the amplifier.

Preferably the or a co-dopant is europium. Also, preferably the or a co-dopant is terbium.

Embodiments of amplifiers according to the invention can operate in the second telecoms window between 1280 and 1350 nm and can be easily pumped by a single semiconductor laser diode unit with a typical small signal gain in excess of 20 dB for 50 mW of pump power. Further embodiments involve the incorporation of another trivalent rare earth ion (example Ytterbium) as a sensitising agent, allowing the possibility of efficient 980 nm pumping.

Although the invention is applicable to bulk optical or planar waveguides, it is preferred that the waveguide is an optical fibre. This can improve the spatial overlap between the dopant, the signal to be amplified and the pump signal. In particular, it is preferred that the optical fibre is a single mode optical fibre. The dopant may be applied only or primarily to the fibre core, or may also be applied to the fibre cladding.

Preferably the waveguide is formed of a glass selected from the group consisting of:
(i) heavy metal mixed halide glasses;
(ii) chloride glasses
(iii) chalcogenide glasses; and
(iv) chalcohalide glasses.

The lifetime of certain of the relevant energy levels in the dopant ions can be decreased (increasing the performance of the amplifier) by promoting lasing within the amplifier. To this end, it is preferred that the amplifier comprises reflector means for promoting lasing in the waveguide.

Preferably, the reflector means comprises mirrors disposed at each end of the waveguide. Alternatively, it is preferred that the reflector means comprises gratings disposed at each end of the waveguide.

Preferably the amplifier comprises means for pumping the amplifier at a pump wavelength selected from the group consisting of: about 810 nanometres, about 910 nanometres and about 1240 nanometres. Alternatively, it is preferred that the amplifier comprises a neodymium-yttrium-aluminium-garnet laser for pumping the amplifier at a pump wavelength of about 1064 nanometres or a neodymium-yttrium-lanthanum-fluoride laser for pumping the amplifier at a pump wavelength of about 1047 nanometres.

In order to improve the amplifier performance further, it is preferred that the glass waveguide is doped with a sensitising agent to increase the absorption at the pump wavelength.

In a preferred embodiment, the sensitising agent is ytterbium. In this case, it is particularly appropriate to employ means for pumping the amplifier at a pump wavelength of about 980 nm.

An amplifier according to the invention is particularly suitable for use in a laser. Alternatively, an amplifier according to the invention is particularly suitable for use in telecommunications equipment.

This invention also provides a method of manufacture of an optical waveguide amplifier, the method comprising the steps of:
doping a glass optical waveguide with dysprosium ions, the highest frequency phonon mode of the glass having an energy of less than 450 $cm^{-1}$; and
doping the glass waveguide with at least one rare earth co-dopant to decrease the lifetime of the $^6H_{11/2}$ and/or $^6H_{13/2}$ energy levels of the dysprosium ion.

This invention also provides a method of manufacture of an optical waveguide amplifier, the method comprising the steps of:
doping a glass optical waveguide with dysprosium ions, the glass not being a fluoride or silica glass; and
doping the glass waveguide with at least one rare earth co-dopant to decrease the lifetime of the $^6H_{11/2}$ and/or $^6H_{13/2}$ energy levels of the dysprosium ion.

The invention will now be described by way of example with reference to the accompanying drawings, throughout which like parts are referred to by like references, and in which.

Figure 1:
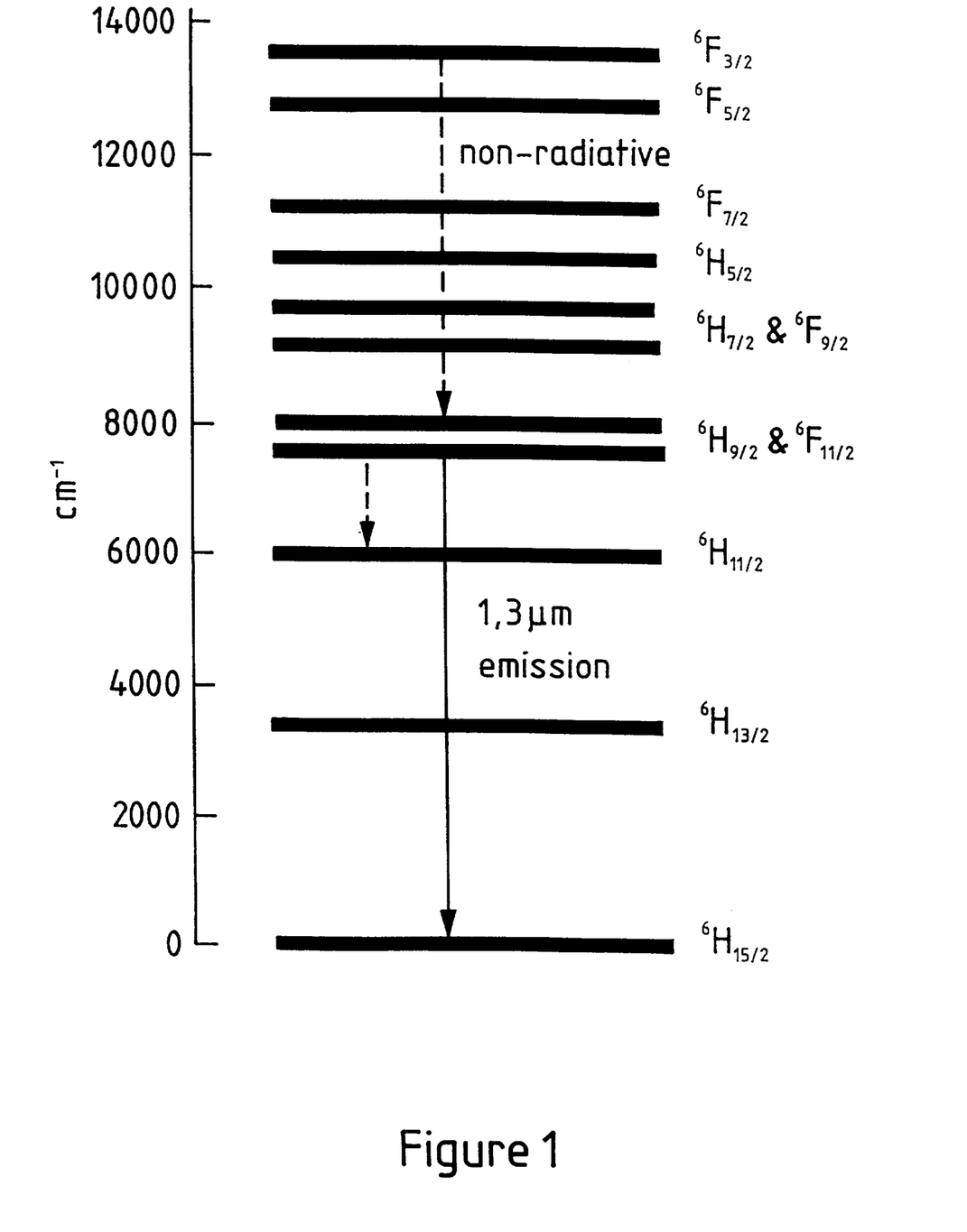
FIG. 1 is a schematic diagram illustrating the energy levels of the Dysprosium ion.

FIG. 1 is a schematic diagram illustrating the energy levels of the Dysprosium ($Dy^{3+}$) ion. When the $Dy^{3+}$ ion is added as a dopant to glass, the $Dy^{3+}$ ion has a characteristic set of absorption lines. The wavelength and magnitude of the absorption lines are dependent on the host glass. If the $Dy^{3+}$-doped glass is to be used as an optical amplifying element, the wavelength and magnitude of the various absorption lines can significantly affect the efficiency and performance of the amplifying element.

Figure 2:
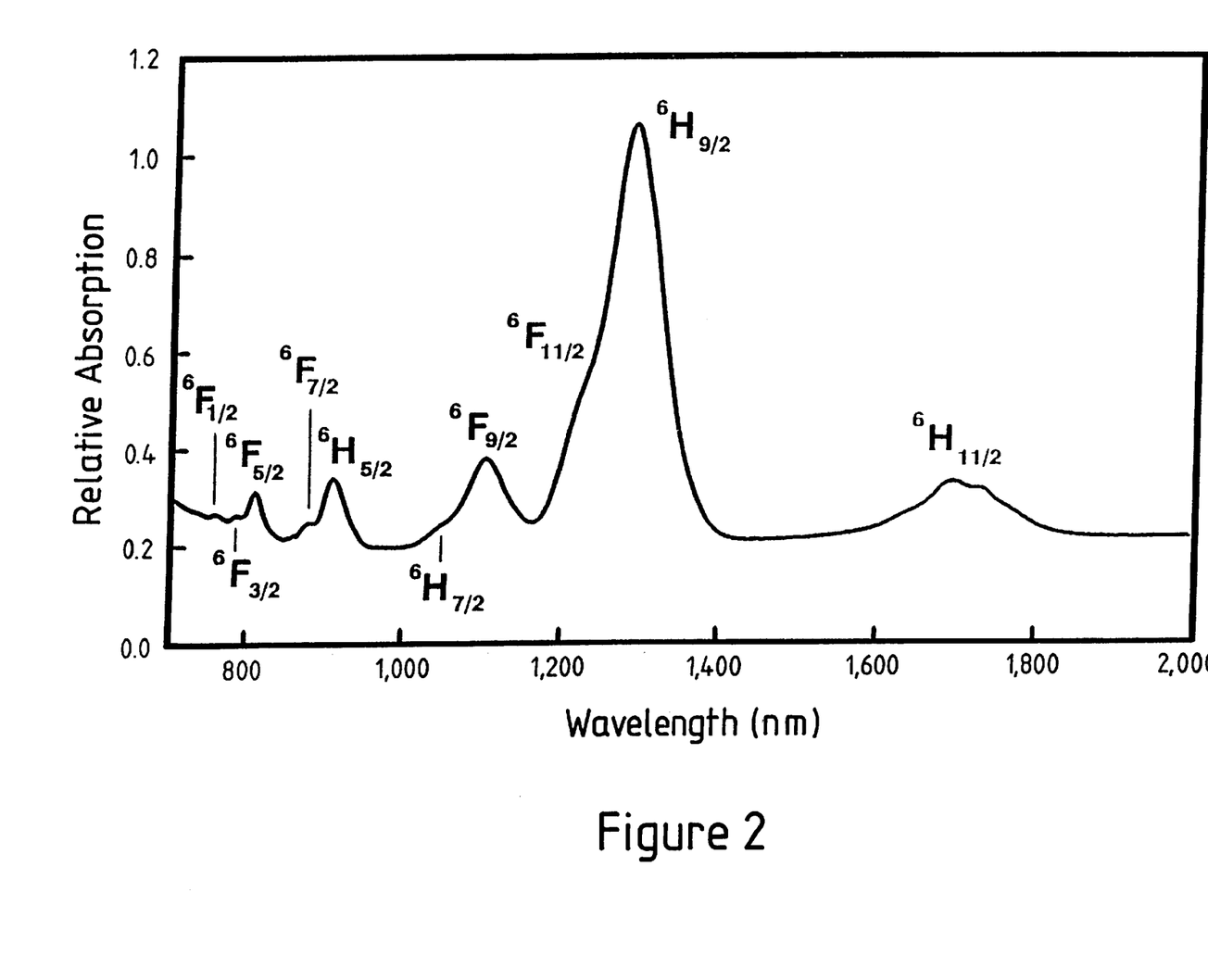
FIG. 2 is a graph showing the absorption spectrum for $Dy^{3+}$-doped Gallium-Lanthanum-Sulphide (Ga:La:S) glass.

An example of an absorption spectrum for $Dy^{3+}$-doped Gallium-Lanthanum-Sulphide (Ga:La:S) glass is shown in FIG. 2. As shown in FIG. 2, there are a number of absorption "peaks", centred around the following approximate wavelengths: 800 nm, 900 nm, 1050 to 1100 nm, and 1240 to 1290 nm.

The wavelengths of the absorption peaks form the possible amplifier pump wavelengths when the doped glass is used as an optical amplifying element. After a $Dy^{3+}$ ion has absorbed a pump photon, the ion 'relaxes' via non-radiative (multi-phonon) decay within a short time to the metastable doublet $6H_{9/2}$–$^6F_{11/2}$, where it stays for a characteristic time which is strongly dependent on the host glass.

An excited ion in the metastable doublet may decay non-radiatively to the underlying $^6H_{11/2}$ energy level at a rate ($W_{NR}$) determined predominantly by the maximum phonon energy of the host glass, and to a lesser extent by a host dependent electron-phonon coupling coefficient.

These physical effects mean that for a given energy gap (example ~1700 $cm^{-1}$ for the $^6H_{9/2}$–$^6F_{11/2}$ to $^6H_{11/2}$ energy gap in $Dy^{3+}$-doped Ga:La:S), a "low phonon energy" glass has a lower non-radiative decay rate than a high phonon energy glass such as silica. Since this non-radiative decay process is in competition with that of spontaneous or stimulated emission from the metastable doublet, the non-radiative decay can dominate over spontaneous or stimulated emission in high phonon energy glasses. Thus little spontaneous emission is observed from the $^6H_{9/2}$–$^6F_{11/2}$ doublet in high phonon energy glasses. The spontaneous emission is characterised by a radiative decay rate ($W_{rad}$) which is also dependent on the glass host and ideally should be large.

In other words, a low phonon energy glass, doped with $Dy^{3+}$ ions, provides a more efficient optical amplifying element than a higher phonon energy glass.

One way of quantatively defining low phonon energy glasses is to quantify the radiative quantum efficiency of the $^6H_{9/2}$–$^6F_{11/2}$ doublet as follows:

$$QE(\%) = 100 \frac{W_{rad}}{W_{rad} + W_{NR}}$$

This definition is related to the glass phonon energy, since a reduction in the glass phonon energy reduces the non-radiative decay rate, and hence increases the radiative quantum efficiency.

A "low phonon energy glass" is defined as one in which the non-radiative decay rate is at such a low level that when the glass is doped with a low concentration of $Dy^{3+}$ ions (for example 0.01 mol% or 100 ppm) the radiative quantum efficiency of the $^6H_{9/2}$–$^6F_{11/2}$ doublet is greater than 5%. (>10% could give even better results). This definition also covers glasses such as chalcohalides which still have a relatively high quantum efficiency because of their large radiative rates.

Examples of low phonon energy glasses are:

(i) heavy metal mixed halide glasses (such as $CdF_2$-$CdCl_2$, $ZnCl_2$-$ZnF_2$ and mixed fluoride/chloride glasses containing Barium, Sodium, Indium, Lead and/or Gallium);

(ii) chloride glasses (such as zinc and cadmium chlorides ($ZnCl_2$, $CdCl_2$));

(iii) chalcogenide glasses (such as germanium sulphide, arsenic sulphide and/or gallium sulphide based glasses including the addition of elements caesium, potassium, zirconium, antimony, lanthanum, phosphorus, gallium, indium, silver, calcium, sodium and bismuth and glasses containing Sulphur and/or Selenium and or Tellurium), this category including Ga:La:S glass; and (iv) Chalcohalide glasses (such as any of the chalcogenide listed glasses with the addition of Chlorine and/or Fluorine).

This definition of low phonon energy glass does not include so-called "pure" fluoride glasses (for example zinc fluoride—barium fluoride—lanthanum fluoride—Aluminium fluoride—sodium fluoride (ZBLAN) or indium fluoride (InF)) or oxide glasses (example $SiO_2$), since the radiative quantum efficiency of the $^6H_{9/2}$–$^6F_{11/2}$ doublet when these glasses are doped with $Dy^{3+}$ ions is very low (less than 5%).

Direct measurement of the radiative quantum efficiency of the $Dy^{3+}$-doped glass is carried out using the so-called "integrating sphere" method, described in the book "Physics and Chemistry of Glasses", M J Payne et al, 1991. An excitation wavelength around 1240 nm is used for this measurement and (for the measurement process) the $Dy^{3+}$ ion concentration is made low (~500 ppm) in order to avoid ambiguous results due to energy transfer between $Dy^{3+}$ ions.

Examples of the quantum efficiencies for $Dy^{3+}$-doped glasses measured using this technique are: 2% for InF glass and 20% for Ga:La:S glass.

Alternatively, a low phonon energy glass may be defined in terms of its maximum phonon energy, as measured by Raman spectroscopy. Here, the maximum phonon energy of the glass is defined as the energy of the highest frequency phonon mode of the glass, defined by the peak of the Raman intensity.

Examples of phonon energies measured using this technique are: ~580 $cm^{-1}$ for ZBLAN glass, ~510 $cm^{-1}$ for InF glass and ~350 $cm^{-1}$ for Ga:La:S glass.

Using this definition of the maximum phonon energy of the glass, a low phonon energy glass is defined as one with a maximum phonon energy of less than 450 $cm^{-1}$. (Better results still could be obtained by glasses in a range of less than e.g. 400 cm).

Figure 3:
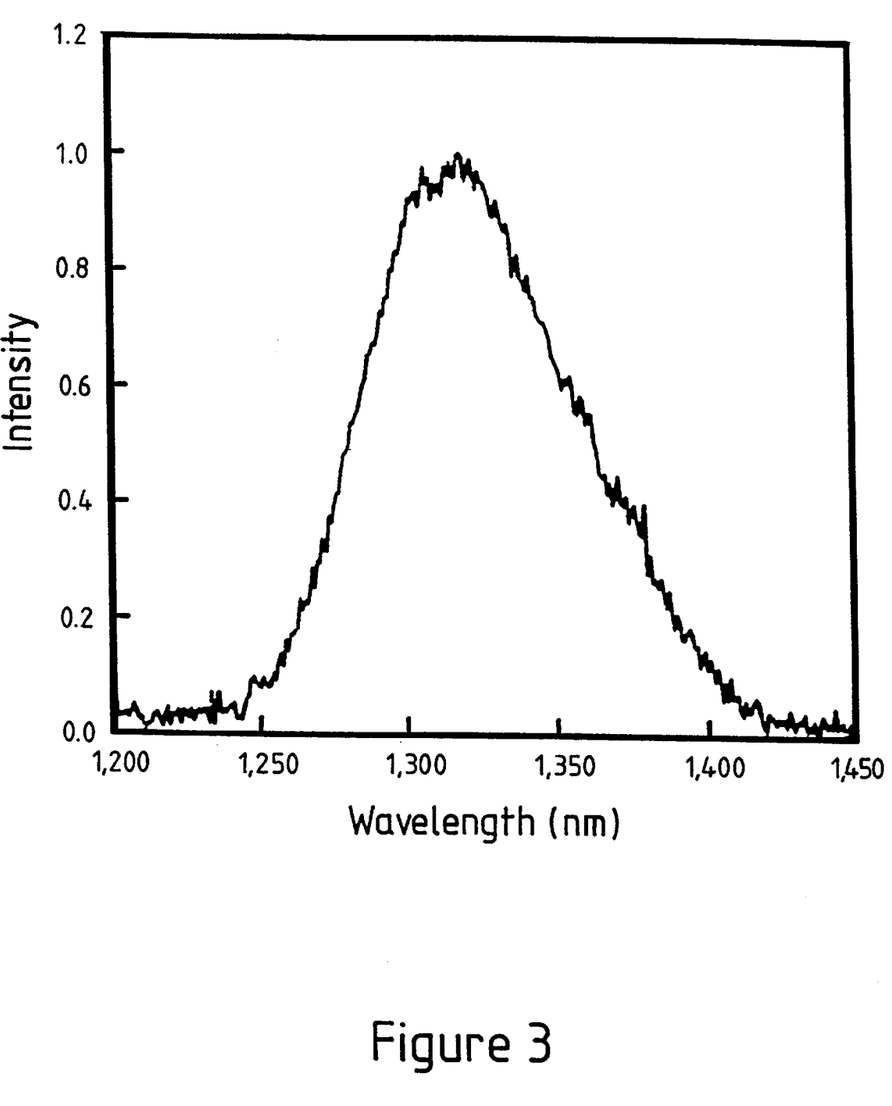
FIG. 3 is a graph of a fluorescence spectrum corresponding to emission from the metastable $^6H_{9/2}$–$^6F_{11/2}$ doublet to the $^6H_{15/2}$ ground level in $Dy^{3+}$-doped Ga:La:S glass.
Figure 4A:
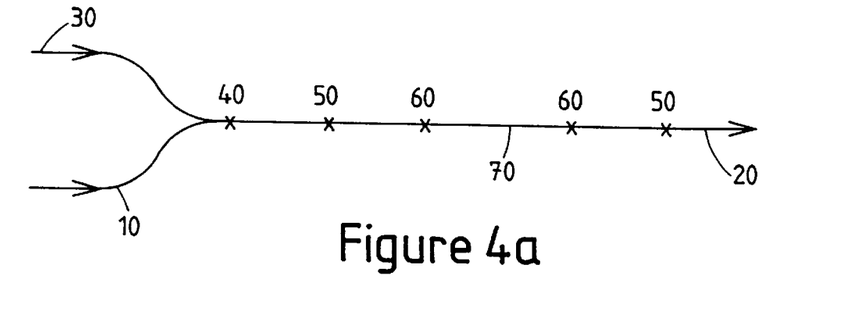
FIGS. 4a to 4d are schematic diagrams of $Dy^{3+}$-doped low phonon energy glass amplifiers, using various pump configurations.
Figure 4B:
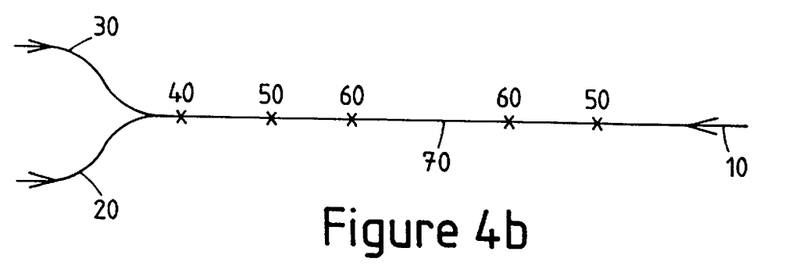
Figure 4C:
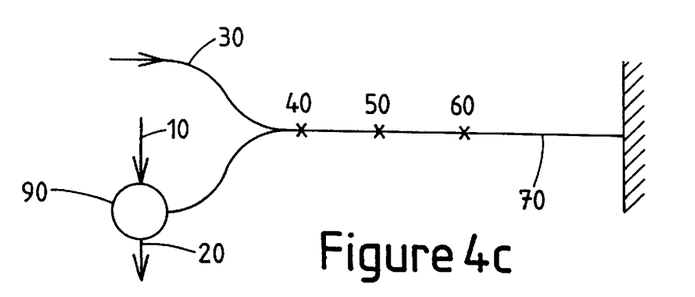
Figure 4D:
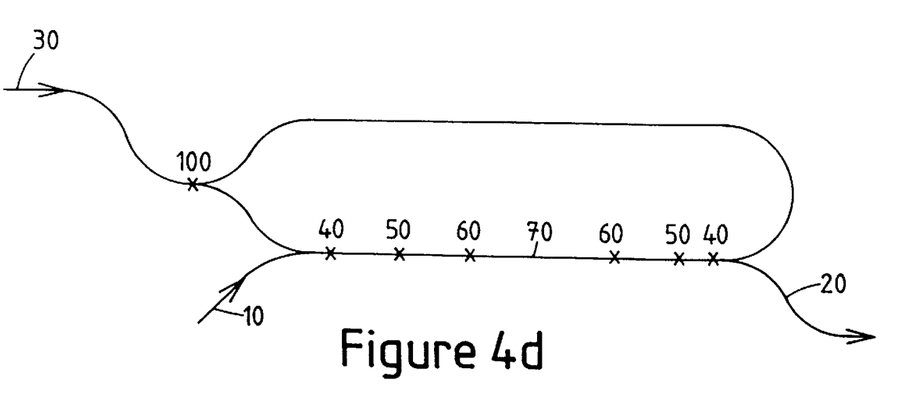

Radiative emission from the doublet occurs to all the lower lying energy levels (i.e. $^6H_{11/2}$, $^6H_{13/2}$ and $^6H_{15/2}$) and the emission spectrum is dependent on the host glass. An example of the fluorescence spectrum, corresponding to emission from the metastable $^6H_{9/2}$–$^6F_{11/2}$ doublet to the $^6H_{15/2}$ ground level, obtained from $Dy^{3+}$-doped Ga:La:S glass, is shown in FIG. 3 and shows a peak wavelength of about 1320 nm.

Although the $Dy^{3+}$ ions can be used as a dopant in various types of waveguide such as planar or bulk optical waveguides, in the present embodiments the ions are incorporated into the core of a glass optical fibre. This can provide an efficient spatial overlap between the $Dy^{3+}$ ions and both the pump and signal radiations. In particular, good results can be obtained with a single mode fibre having a core diameter of less than 10 $\mu$m and a core/cladding refractive index difference of less than 0.1%.

The optical fibre may be made by standard fabrication techniques such as the double crucible method, the rod-in-tube method, extrusion rotational casting or the so-called "solgel" method. Typical $Dy^{3+}$-doping levels for such optical fibre cores are within the approximate range 0.01 mol %–5 mol % (about 100 ppm–50000 ppm).

The process of amplification is similar to that taking place in the EDFA referred to above. As the pump radiation propagates along the fibre length, absorption occurs giving a population in the metastable doublet $^6H_{9/2}$–$^6F_{11/2}$. Propagation of a weak signal beam (for example, a signal at 1320 nm) through the fibre leads to the process of stimulated emission and net gain if the amplification is larger than any losses.

The stimulated emission lineshape for $Dy^{3+}$ in Ga:La:S is similar to the spontaneous emission shown in FIG. 3 and peaks at about 1320 nm.

FIGS. 4a to 4d are schematic diagrams of $Dy^{3+}$-doped low phonon energy glass fibre amplifiers, using various pump configurations. Each of the configurations uses an angled splice between a high NA low phonon energy glass fibre and a high NA silica fibre, which is tapered. The configurations shown in FIGS. 4a to 4d are referred to as "co-directional", "counter-directional", "double-pass" and "bi-directional" pumping respectively.

In each of FIGS. 4a to 4d, signal light is input at an input port 10 and output at an output port 20. The pump signal is input at a pump input 30. FIGS. 4a to 4d also show a number of interconnected optical fibre units, referred to by the following reference numbers:

| Reference Number | Unit |
| --- | --- |
| 40 | pump signal multiplexer |
| 50 | tapered silica fibre |
| 60 | angled splice |
| 70 | $Dy^{3+}$ doped low phonon energy glass fibre |
| 80 | mirror having high reflectance at pump and signal wavelengths |
| 90 | optical circulator |
| 100 | 50:50 coupler |

Figure 5:
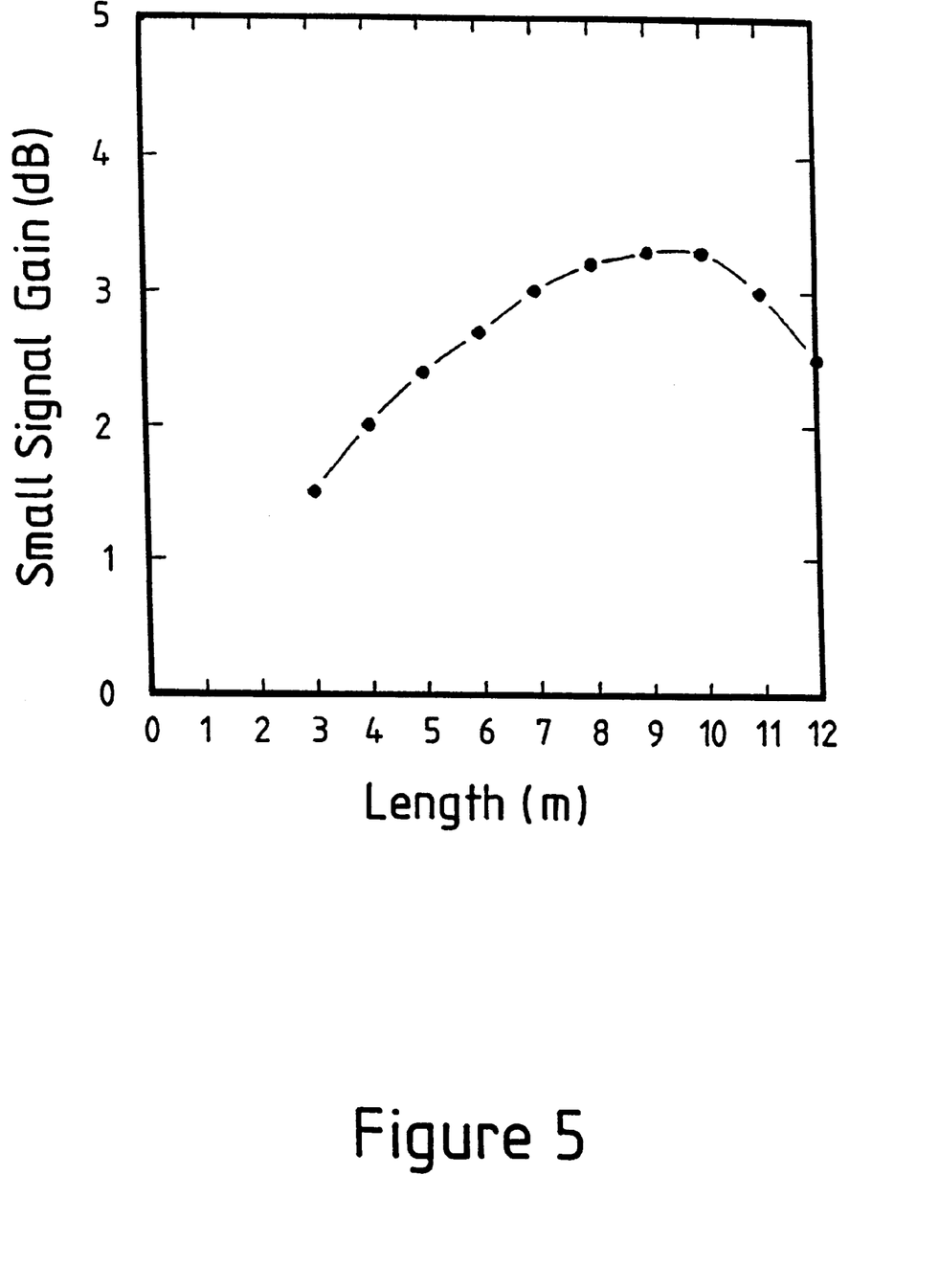
FIG. 5 is a graph of small signal gain against fibre length for a co-directional pumped $Dy^{3+}$-doped Ga:La:S glass optical fibre amplifier.
Figure 6:
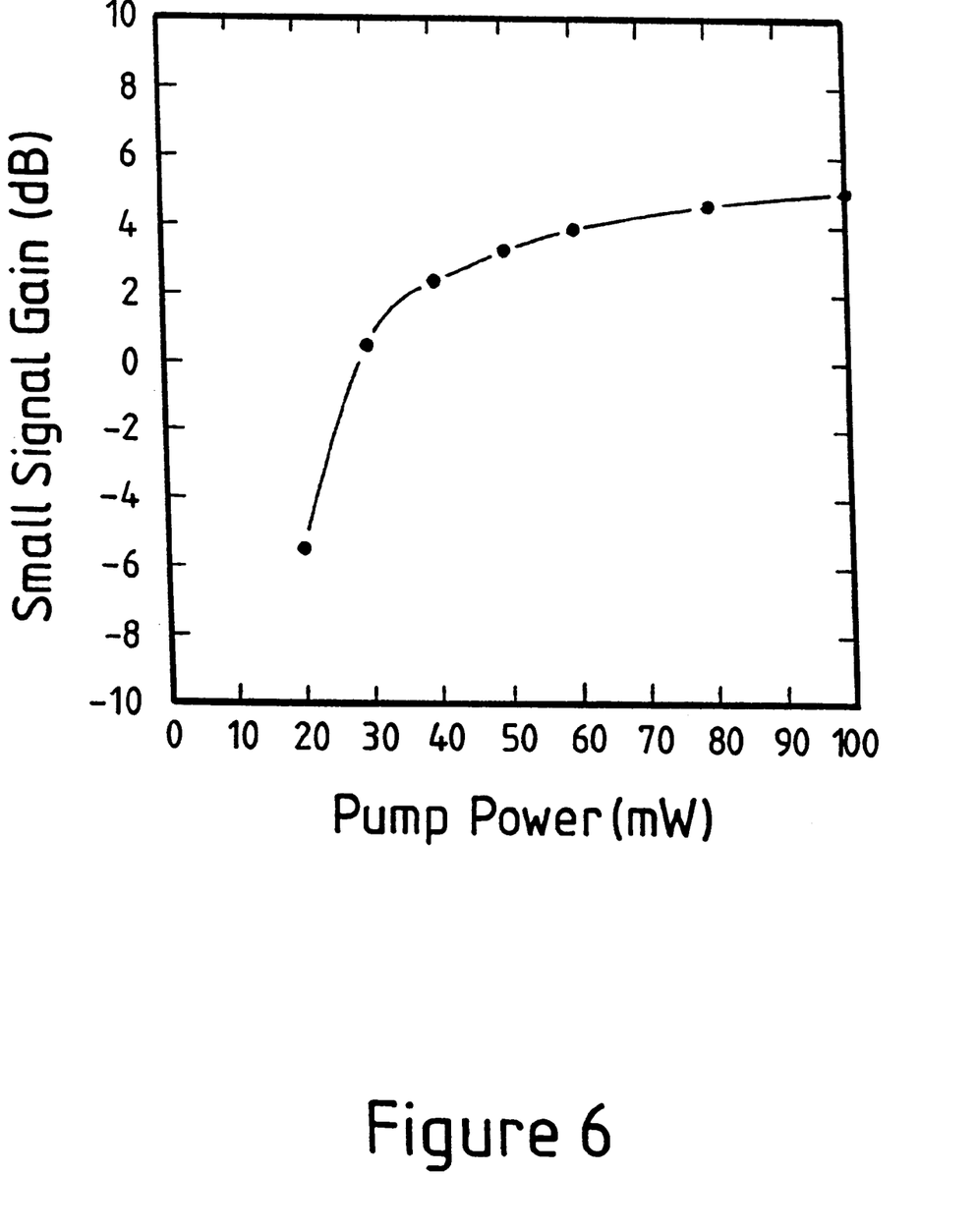
FIG. 6 is a graph of small signal gain against pump power for a co-directional pumped $Dy^{3+}$-doped Ga:La:S glass optical fibre amplifier.

The performance of a co-directional pumped $Dy^{3+}$-doped Ga:La:S glass optical fibre amplifier is shown in FIG. 5 and 6. In particular, FIG. 5 is a graph of small signal gain against fibre length and FIG. 6 is a graph of small signal gain against pump power.

In this embodiment, the amplifier operating wavelength is 1320 nm, and is pumped at 1240 nm by a semiconductor laser diode. The input signal power is 1 $\mu$w. The fibre contains 500 ppm $Dy^{3+}$ ions, and is characterised by a NA=0.4 and cutoff wavelength=900 nm.

FIG. 5 demonstrates that an optimum device length is 10 m, for which the peak gain is ~3 dB at 50 mW of pump power. FIG. 6 shows a peak gain of ~5 dB for 100 mW of pump power.

The skilled man will appreciate that the term 'optimum' does not necessarily refer to an absolute maximum of performance, but instead refers to the result of an engineering process to improve the performance of the device as far as is reasonable given other possible design constraints.

The device could also be pumped at any of the other absorption bands (1100 nm, 1050 nm, 910 nm, 880 nm, 810 nm 780 nm, or 760 nm), although the device length and efficiency will not be the same as those shown in FIGS. 5 and 6.

Although the basic Ga:La:S device described above offers significantly better performance than previous $Dy^{3+}$-doped amplifiers using high phonon energy glasses, its performance is limited by two main physical effects. The radiative quantum efficiency for the $Dy^{3+}$-doped Ga:La:S glass is ~20%, which indicates that about 80% of the ions in the metastable doublet decay non-radiatively to the lower lying energy level ($^6H_{11/2}$). When doped into Ga:La:S glass, the lifetime of the $Dy^{3+}$ energy levels $^6H_{11/2}$ and $^6H_{13/2}$ are ~1 msec and ~3.5 msec respectively, as compared with ~55 $\mu$s for the $^6H_{9/2}$–$^6F_{11/2}$ doublet. Thus, when the glass is used as an amplifying element, a significant number of ions will reside in both of these energy levels rather than returning to the ground level ($^6H_{15/2}$). The result of this 'bottle-necking' is an increase in the optimum device length and hence the net background loss, thus tending to limit the amplifier efficiency. Furthermore, signal (1.3 $\mu$m) excited state absorption from both of these levels to the higher lying levels $^6F_{3/2}$, $^6F_{5/2}$, $^6F_{7/2}$ can limit further the amplifier efficiency and available peak gain.

However, the efficiency of a basic $Dy^{3+}$-doped Ga:La:S fibre amplifier can be improved by co-doping the glass with other rare earth ions. In particular, co-doping of the $Dy^{3+}$-Ga:La:S fibre with the trivalent rare earth ion Terbium or trivalent Europium (or both) is observed to substantially reduce the lifetime of the $^6H_{11/2}$ and $^6H_{13/2}$ energy levels.

Figure 7:
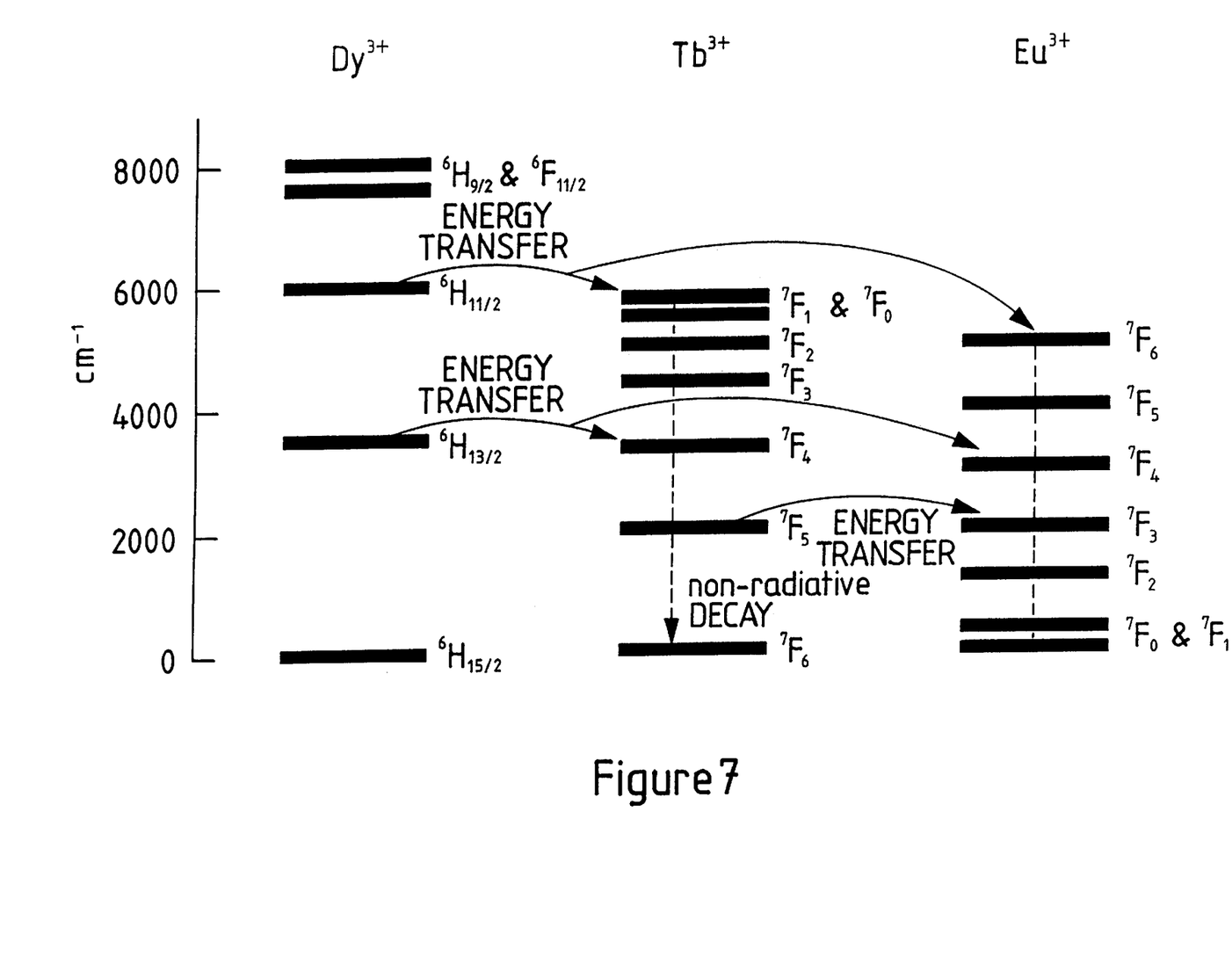
FIG. 7 is a schematic energy level diagram for $Eu^{3+}$, $Tb^{3+}$ and $Dy^{3+}$ ions.

The energy level diagrams for $Eu^{3+}$ and $Tb^{3+}$ ions along with that for the $Dy^{3+}$ ion are shown in FIG. 7. In the co-doped schemes efficient (resonant) energy transfer occurs from the $^6H_{11/2}$ and $^6H_{13/2}$ energy levels of $Dy^{3+}$ to one of the closely spaced energy levels of $Tb^{3+}$ or $Eu^{3+}$. Fast non-radiative decay of the excited $Tb^{3+}$ or $Eu^{3+}$ ions now occurs to the respective ground states via these closely spaced energy levels. The lifetime of the $^6H_{11/2}$ and $^6H_{13/2}$ energy levels in a $Dy^{3+}$-doped glass, co-doped with suitable concentrations of $Tb^{3+}$ and/or $Eu^{3+}$, is now considerably shorter than that of the metastable doublet $^6H_{9/2}$–$^6F_{11/2}$.

Examples of suitable co-doping levels are 0.01–5mol % $Eu^{3+}$ and 0.01–5mol % $Tb^{3+}$ ions (~100–50000 ppm).

There are other means of decreasing the lifetime of these energy levels. These include the use of one or two high reflectors at the end(s) of the fibre to achieve lasing from either (or both) the $^6H_{11/2}$ and $^6H_{13/2}$ energy levels. The high reflector may be in the form of a external mirrors or gratings (either external or directly written into the fibre).

Figure 8:
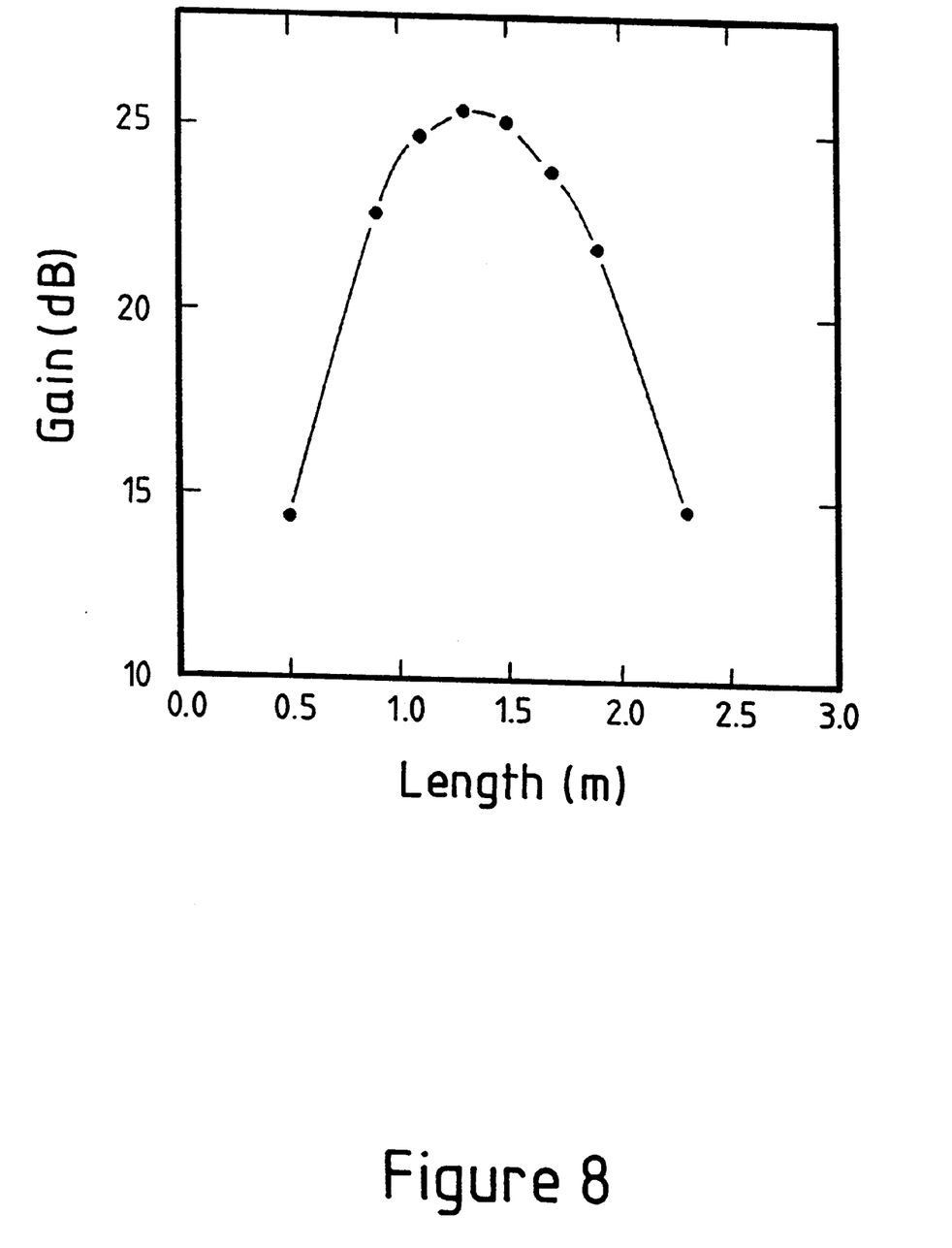
FIG. 8 is a graph of gain against fibre length for a $Tb^{3+}/Eu^{3+}/Dy^{3+}$ co-doped Ga:La:S glass optical fibre amplifier.
Figure 9:
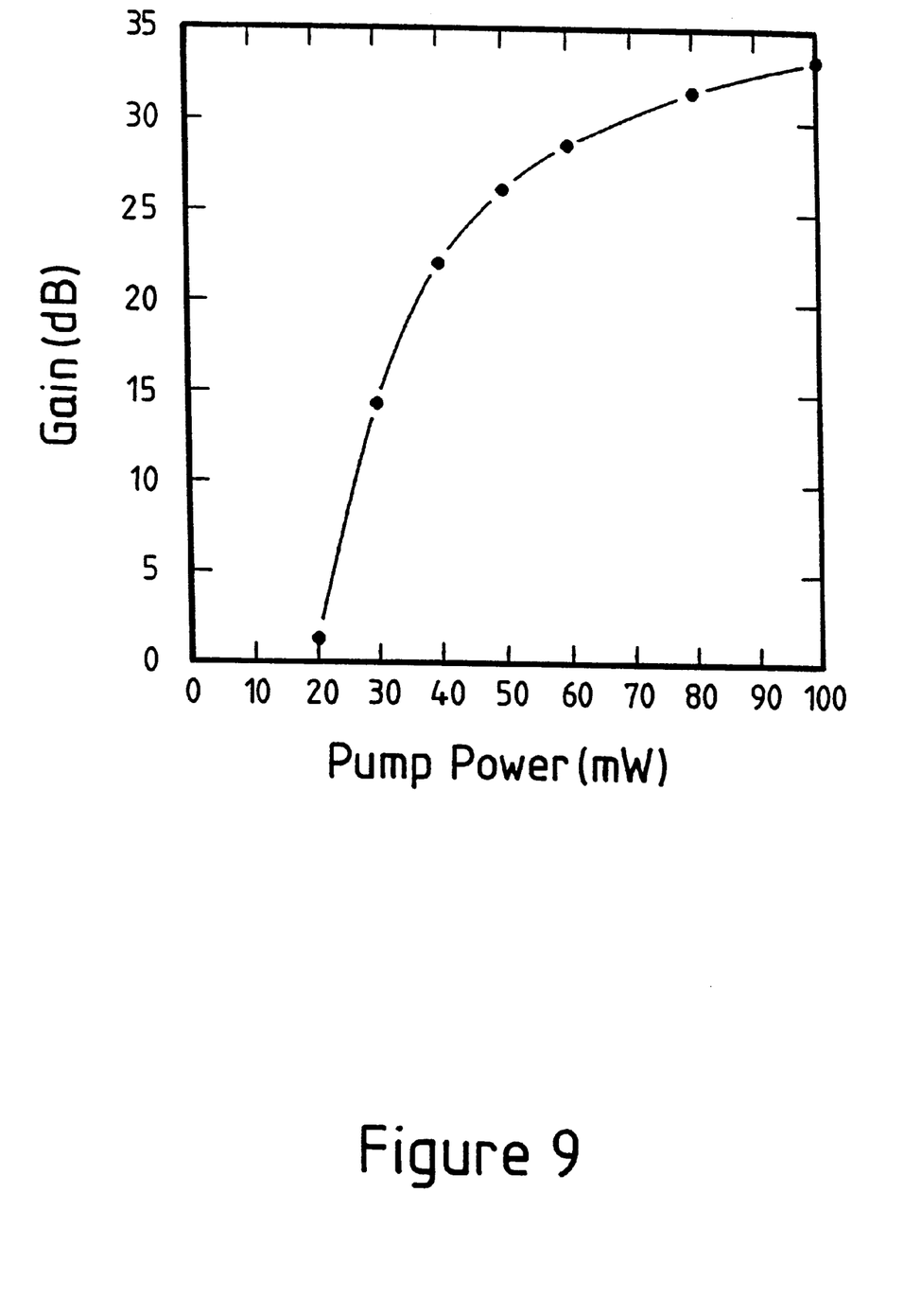
FIG. 9 is a graph of gain against pump power for a $Tb^{3+}/Eu^{3+}/Dy^{3+}$ co-doped Ga:La:S glass optical fibre amplifier.

The characteristics of a $Tb^{3+}/Eu^{3+}/Dy^{3+}$ co-doped Ga:La:S glass optical fibre amplifier are shown in FIGS. 8 and 9. In particular, FIG. 8 is a graph of gain against fibre length for a $Tb^{3+}/Eu^{3+}/Dy^{3+}$ co-doped Ga:La:S glass optical fibre amplifier and FIG. 9 is a graph of gain against pump power.

As in the embodiment described with reference to FIGS. 5, 6 and 7, the device is co-directionally pumped, the fibre NA is 0.4, the fibre cut-off wavelength is 900 nm, the pump wavelength is 1240 nm, the signal wavelength is 1320 nm and the signal power is 1 μw. The fibre core contains 500 ppm $Dy^{3+}$, 5000 ppm $Eu^{3+}$ and 5000 ppm $Tb^{3+}$.

FIG. 8 shows that the optimum device length for 50 mW of pump power is reduced to ~1.3 m (compared to a length of about ~10 m in the case of no co-doping—see FIG. 5). FIG. 9 demonstrates that a substantial increase in the maximum gain (from 5 dB to greater than 30 dB) can be achieved by co-doping the fibre. In other words, co-doping the fibre can substantially increase the amplifier efficiency.

The longevity of high power semiconductor laser diode units operating at 1240 nm, based on InGas technology, has not been fully established. This is not the case for diodes operating in the wavelength range 750–980 nm and based on the mature technology of AlGaAs. For this reason, it would be advantageous to be able to pump the optical amplifier at wavelengths in the range 750–980 nm.

As already stated, it is in fact possible to pump the $Dy^{3+}$-doped low phonon energy glass fibre amplifier at wavelengths other than 1240 nm. The most useful of the alternative wavelengths are the 910 and 810 nm absorption bands.

FIG. 2 shows that the absorption cross section at these wavelengths is lower than the cross section at 1240 nm and 1320 nm. One consequence of this is a substantial increase in the pump saturation power of the amplifier and hence a lower efficiency for the device when operated at low pump powers.

Figure 10:
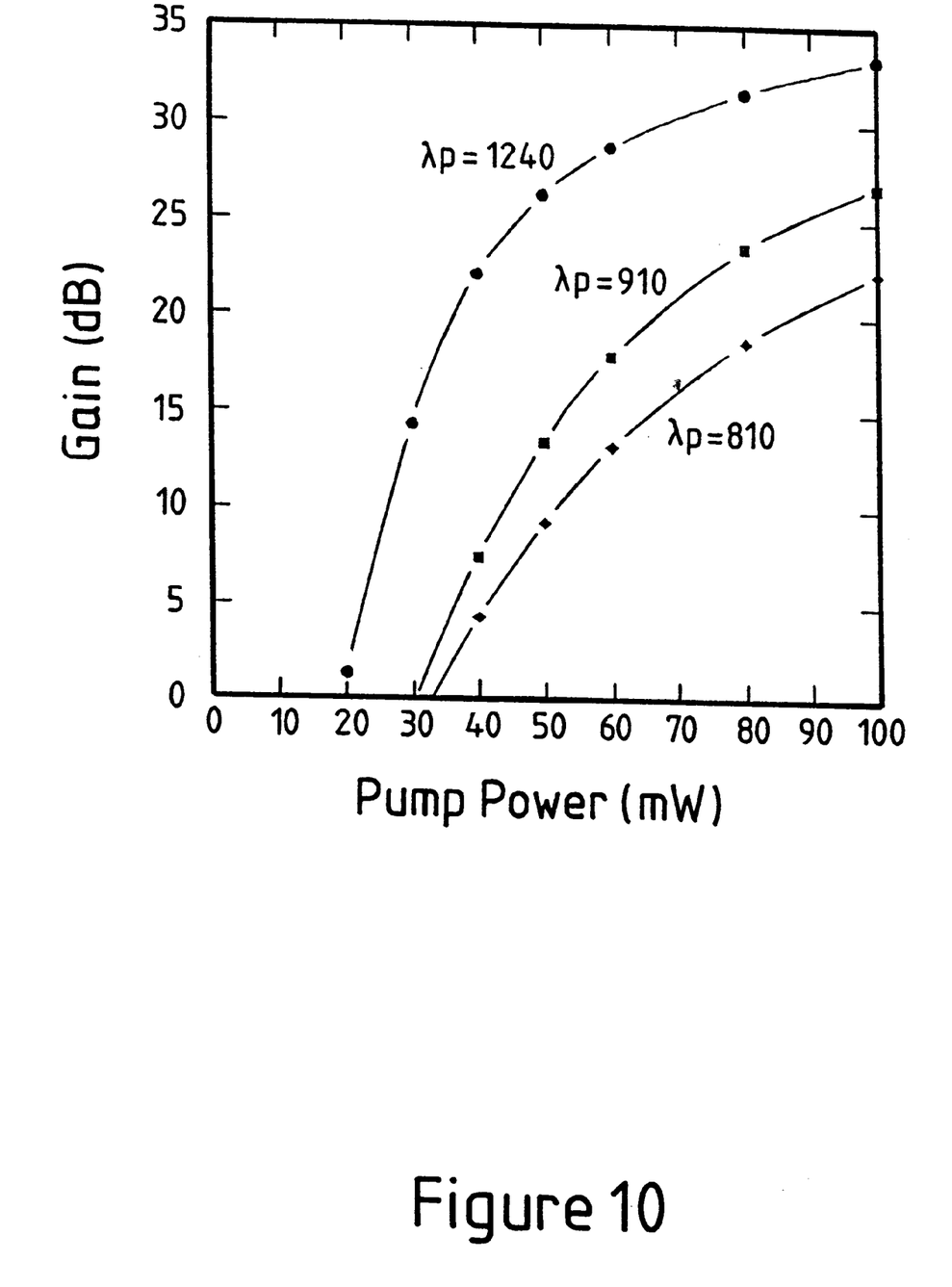
FIG. 10 is a graph of gain against pump power for a $Eu^{3+}/Tb^{3+}/Dy^{3+}$ co-doped Ga:La:S glass fibre amplifier, pumped at three different pump wavelengths.

FIG. 10 is a graph illustrating small signal gain of a $Eu^{3+}/Tb^{3+}/Dy^{3+}$ co-doped Ga:La:S glass fibre amplifier, when pumped at any one of 810, 910 and 1240 nm wavelengths using high power semiconductor laser diodes. The cut-off wavelengths are 900 nm, 800 nm and 700 nm for 1240 nm, 910 nm and 810 nm pumping respectively, whilst the optimum device length varies 1.3 m, 1.5 m and 1.7 m respectively.

When operated at relatively low pump powers (<100 mW), the 1240 nm pump wavelength provides the most efficient amplification of the group. This can be attributed to the relatively small absorption cross sections at both 910 nm and 810 nm, increasing the pump saturation power of the amplifier.

Application of the $Dy^{3+}$-doped low phonon energy glass fibre amplifier as a power amplifier is best achieved by high power pumping of the device. Direct pumping of the $Dy^{3+}$ ions is possible at 1064 nm, a wavelength corresponding to the output commercial Nd:YAG lasers or at 1047 nm (by a neodymium-yttrium-lanthanum-fluoride laser). These lasers have output powers in excess of 1 W. Although the absorption cross section at 1064 nm is very much less than that at 1240 nm, and indeed lower than those at 810 nm and 910 nm, the efficiency of the power amplifier can still be made high due to the large pump powers employed.

Figure 11:
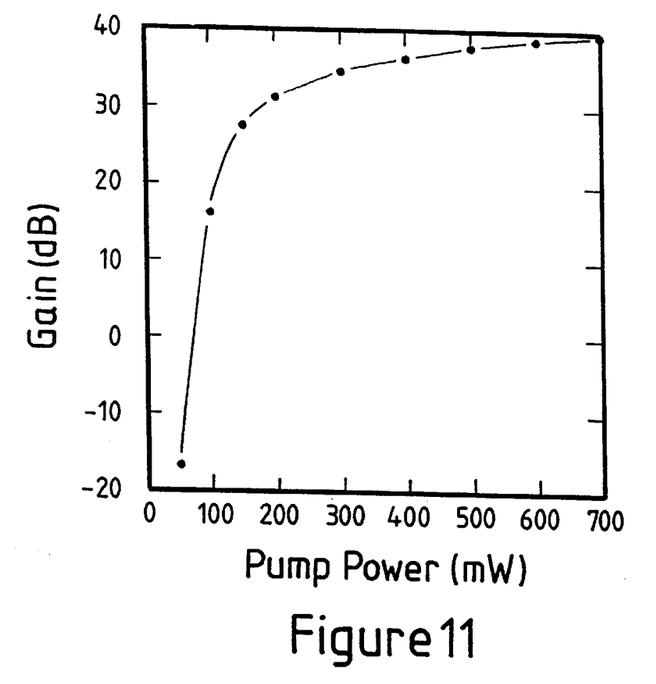
FIG. 11 is a graph of gain against pump power for a Nd:YAG pumped $Eu^{3+}/Tb^{3+}/Dy^{3+}$ co-doped fibre amplifier.

The small signal gain of a Nd:YAG pumped $Eu^{3+}/Tb^{3+}/Dy^{3+}$ co-doped fibre is shown in FIG. 11. The fibre parameters are: NA=0.4, cut-off wavelength=990 nm, length=2.5 m, signal wavelength=1320 nm and signal power=1 μw. The fibre core is doped with 500 ppm $Dy^{3+}$ and 5000 ppm of both $Eu^{3+}$ and $Tb^{3+}$ ions.

Figure 12:
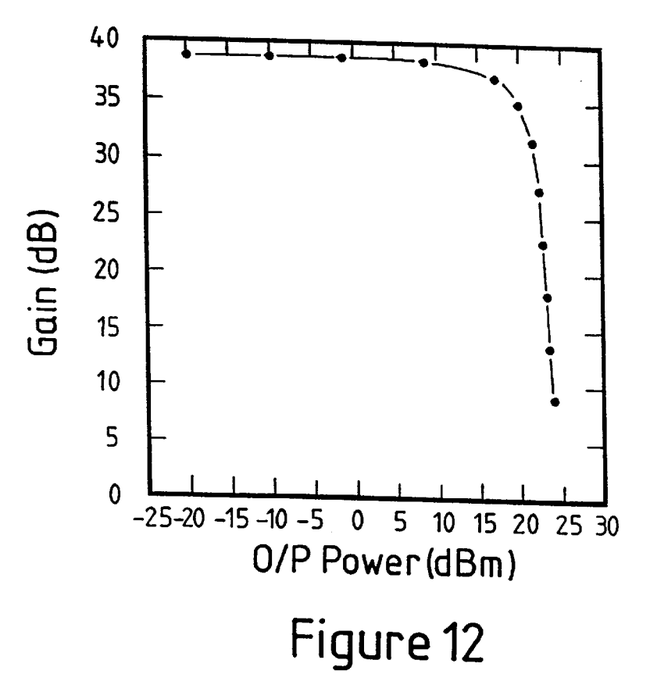
FIG. 12 is a graph of gain against output power for a Nd:YAG pumped $Eu^{3+}/Tb^{3+}/Dy^{3+}$ co-doped fibre amplifier.

FIG. 12 is a graph of gain against output power for the Nd:YAG pumped $Eu^{3+}/Tb^{3+}/Dy^{3+}$ co-doped fibre amplifier. FIG. 12 demonstrates that gain in excess of 30 dB is available at output powers in excess of 20 dBm (100 mW).

The absorption spectrum for $Yb^{3+}$-doped Ga:La:S peaks at ~980 nm and shows considerable overlap with the $Dy^{3+}$ ion absorption within this wavelength region. Incorporation of a suitable doping level of $Yb^{3+}$ ions into a $Dy^{3+}$-doped fibre allows efficient energy transfer between the $Yb^{3+}$ and $Dy^{3+}$ ions. Energy transfer occurs from the $^2F_{5/2}$ energy level in $Yb^{3+}$ to the $^6H_{5/2}$ energy level of $Dy^{3+}$ from which non-radiative decay occurs to the metastable doublet $^6H_{9/2}$–$^6F_{11/2}$, allowing amplification at 1320 nm in a similar manner to that described above for the $Dy^{3+}$-doped device. Hence a $Yb^{3+}/Dy^{3+}/Eu^{3+}/Tb^{3+}$ co-doped amplifier may be efficiently pumped at around 980 nm with a substantial increase in the efficiency when compared to a similarly pumped $Dy^{3+}/Eu^{3+}/Tb^{3+}$-doped device.

Figure 13:
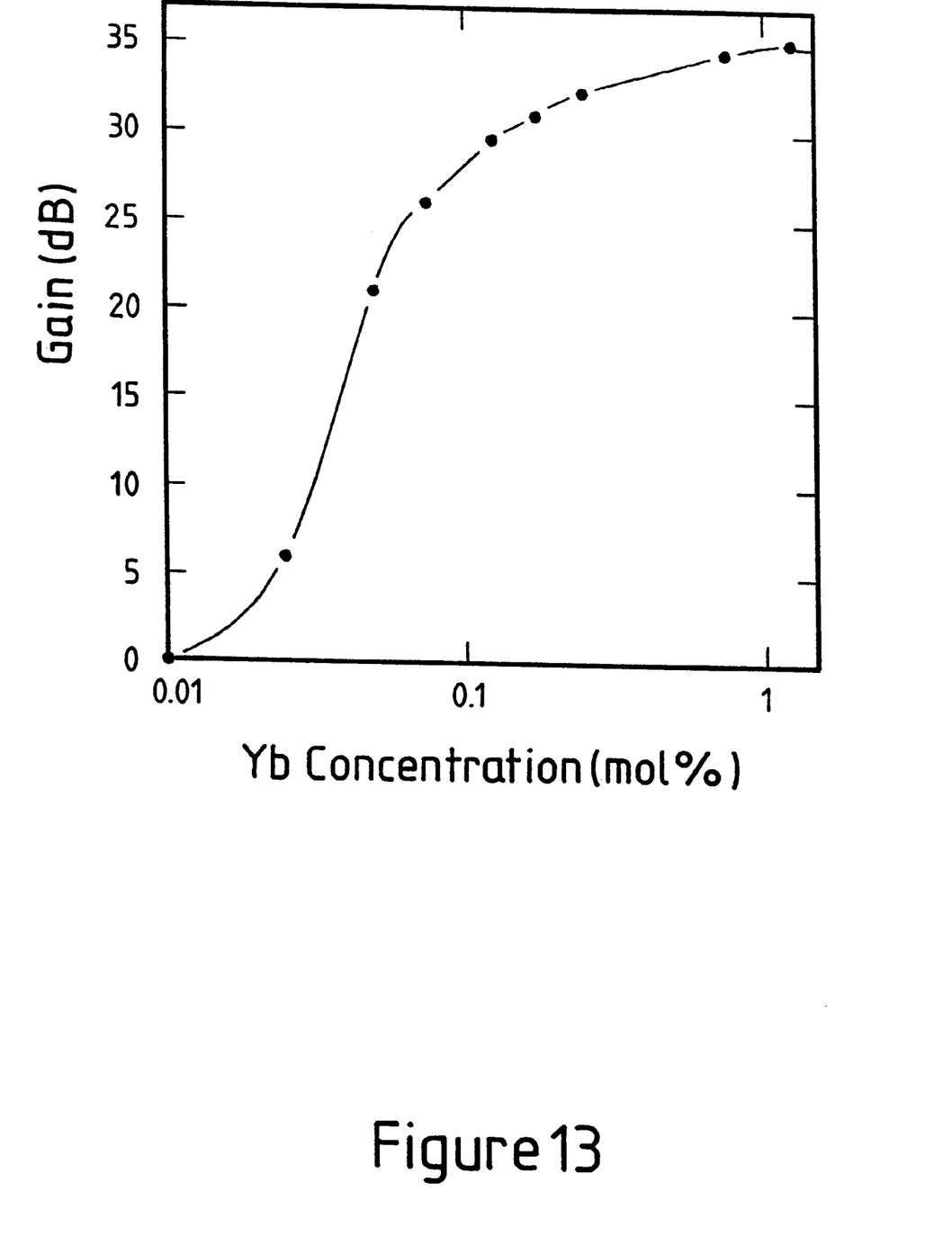
FIG. 13 is a graph of gain against Yb concentration for a $Yb^{3+}/Eu^{3+}/Tb^{3+}/Dy^{3+}$ co-doped fibre amplifier.

The $Eu^{3+}/Tb^{3+}/Dy^{3+}$ amplifier described with reference to FIGS. 8 and 9 gives no net gain for 100 mW of pump power at a pump wavelength of 980 nm. In contrast, the results obtained for a series of $Yb^{3+}/Eu^{3+}/Tb^{3+}/Dy^{3+}$ co-doped amplifiers, pumped with 100 mW, are shown in FIG. 13. All these devices are 0.05 mol % $Dy^{3+}$-doped with varying levels of $Yb^{3+}$-added to the fibre core. The fibre NA=0.4 and cut-off wavelength=850 nm. FIG. 13 shows that a $Yb^{3+}/Dy^{3+}/Eu^{3+}/Tb^{3+}$ co-doped amplifier pumped at 980 nm can achieve a device performance as good as the 1240 nm pumped device, and better than either the 810 or 910 nm pumped ones (see FIG. 10). An explanation for this is that $Yb^{3+}$ can act as a "sensitising agent" for a $Dy^{3+}$-doped amplifier or laser in order to increase the pump absorption at wavelengths outside the main $Dy^{3+}$ absorption peaks.

The amplifiers described above may be used as lasers at the wavelengths at which amplification is obtained. For example, an amplifier comprising $Dy^{3+}$-doped low phonon energy glass may be used as a laser at around 1320 nm, using either external mirror(s) or gratings (either external or directly written into the fibre), and either with or without $Eu^{3+}/Tb^{3+}$ co-doping.

The lasers could make use of a sensitising agent such as $Yb^{3+}$ as a co-dopant in a $Dy^{3+}$-doped low phonon energy glass for operation at around 1320 nm, either with or without $Eu^{3+}/Tb^{3+}$-co-doping.

In another example, a $Dy^{3+}$-doped low phonon energy glass fibre may be operated as a laser at around either 1.7 μm or 2.8 μm (employing the $^6H_{11/2}$–$^6H_{15/2}$ and $^6H_{13/2}$–$^6H_{15/2}$ transitions respectively) using mirrors or gratings. A sensitising agent may be used to increase the pump absorption of a $Dy^{3+}$-doped fibre laser operating around 1.7 μm and/or 2.8 μm.

Amplifiers and lasers as described above can be used in a variety of applications such as in telecommunication equipment. For example, an optical amplifier as described above could be used in a repeater device forming part of an optical fibre signal transmission link.

We claim:

1. An optical waveguide amplifier comprising a glass optical waveguide doped with dysprosium ions, the highest frequency phonon mode of the glass having an energy of less than 450 cm$^{-1}$, in which the glass waveguide is doped with at least one rare earth co-dopant to decrease the lifetime of the $^6H_{11/2}$ and/or $^6H_{13/2}$ energy levels of the dysprosium ion by transfer of energy from the $^6H_{11/2}$ and/or $^6H_{13/2}$ energy levels of the dysprosium ions to ions of the rare earth co-dopant.

2. An amplifier according to claim 1, in which the or a co-dopant is europium.

3. An amplifier according to claim 1, in which the or a co-dopant is terbium.

4. An amplifier according to claim 1, in which the waveguide is an optical fibre.

5. An amplifier according to claim 4, in which the optical fibre is a single mode optical fibre.

6. An amplifier according to claim 1, in which the waveguide is formed of a glass selected from the group consisting of:
   (i) heavy metal mixed halide glasses;
   (ii) chloride glasses
   (iii) chalcogenide glasses; and
   (iv) chalcohalide glasses.

7. An amplifier according to claim 1, comprising reflector means for promoting lasing in the waveguide.

8. An amplifier according to claim 7, in which the reflector means comprises mirrors disposed at each end of the waveguide.

9. An amplifier according to claim 7, in which the reflector means comprises gratings disposed at each end of the waveguide.

10. An amplifier according to claim 1, comprising means for pumping the amplifier at a pump wavelength selected from the group consisting of: about 810 nanometres, about 910 nanometres and about 1240 nanometres.

11. An amplifier according to claim 1, comprising a neodymium-yttrium-aluminium-garnet laser for pumping the amplifier at a pump wavelength of about 1064 nanometres or a neodymium-yttrium-lanthanum-fluoride laser for pumping the amplifier at a pump wavelength of about 1047 nanometres.

12. An amplifier according to claims 1, in which the glass waveguide is doped with a sensitising agent to increase the absorption at the pump wavelength.

13. An amplifier according to claim 12, in which the sensitising agent is ytterbium.

14. An amplifier according to claim 13, comprising means for pumping the amplifier at a pump wavelength of about 980 nanometres.

15. A laser comprising an amplifier according to claim 1.

16. Telecommunications equipment comprising an optical waveguide amplifier according to claim 1.

17. A method of manufacture of an optical waveguide amplifier, the method comprising the steps of:
    doping a glass optical waveguide with dysprosium ions, the highest frequency phonon mode of the glass having an energy of less than 450 cm$^{-1}$; and
    doping the glass waveguide with at least one rare earth co-dopant to decrease the lifetime of the $^6H_{11/2}$ and/or $^6H_{13/2}$ energy levels of the dysprosium ion by transfer of energy from the $^6H_{11/2}$ and or $^6H_{13/2}$ energy levels of the dysprosium ions to ions of the rare earth co-dopant.

* * * * *

UNITED STATES PATENT AND TRADEMARK OFFICE
CERTIFICATE OF CORRECTION

PATENT NO. : 5,936,762
DATED : August 10, 1999
INVENTOR(S) : Bryce Neilson Samson et al.

It is certified that error appears in the above-identified patent and that said Letters Patent is hereby corrected as shown below:

Title page,
The actual filing date was April 24, 1995, not April 22, 1995, as indicated. The following prior art of record was excluded from printing -- 4,044,315      08/23/77          Snitzer
5,379,149         01/08/95          Snitzer et al.
0,570,743         11/24/93          EP --

Electronic Letters, vol. 29, no. 2, ISSN 0013-5194, pages 237-239, XP 000331643 HEWAK D W ET AL. 'Low phono-energy glasses for efficient 1.3 mu m optical fibre amplifiers' - 21/1/93.

Spie Vol.1817 - Optical Communications, Hsinchu, Taiwan, 16-18 Dec. 1992, vol. 1817, ISSN 0277-786X, pages 134-140, JONG HEO ET AL, 'Optical characteristics of chalcogenide and heavy metal oxide glasses doped with Rare-earths'- Dec.'92.

IEEE Photonic Technology Letters, Oct. 1993, USA, vol. 5, no. 10, ISSN 1041-1135, pages 1162-1164, XP 000414206 KRINGLEBOTN JT ET AL, Efficient diode- pumped single-frequency erbium: ytterbium fiber laser'- Oct. '93.

Electronics Letters, UK, vol. 29, no. 12, ISSN 0013-5194, pages 1054-1056, XP 004469115 PERCIVAL R M ET AL, 'Thulium doped terbium sensitised CW flouride fibre laser operating on the 1.47 mu m transition' - 10/6/93.

Optics Letters, USA, vol. 19, no. 12, ISSN 0146-9592, pages 904-906, WEI K ET AL, 'Spectroscopy of Dy/sup 3 +/ in Ge-Ga-S glass and its suitability for 1.3-mu m fiber-- optical amplifier applications' - 15/6/94.

Electronics Letters, UK, vol. 30, no. 19, ISSN 0013-5194, pages 1617-1619, SAMSON B N ET AL, 'Dysprosium doped Ga:La:S glass for an efficient optical fibre amplifier operating at 1.3 mu m' - 15/9/94.

UNITED STATES PATENT AND TRADEMARK OFFICE
CERTIFICATE OF CORRECTION

PATENT NO. : 5,936,762
DATED : August 10, 1999
INVENTOR(S) : Bryce Neilson Samson et al.

It is certified that error appears in the above-identified patent and that said Letters Patent is hereby corrected as shown below:

Electronics Letters, UK, vol. 30, no.12, ISSN 0013-5194, pages 968-970, HEWAK DW ET AL, 'Emission at 1.3 mu m from dysprosium-doped Ga:La:S glass' -9/6/94.

Signed and Sealed this

Nineteenth Day of March, 2002

Attest:

JAMES E. ROGAN
*Director of the United States Patent and Trademark Office*

*Attesting Officer*